United States Patent
Nousiainen

(10) Patent No.: US 6,980,828 B2
(45) Date of Patent: Dec. 27, 2005

(54) MULTI-MEDIA MOBILE COMMUNICATION DEVICE AND RELATED CONSTRUCTION METHOD

(75) Inventor: Jaakko Nousiainen, Marttila (FI)

(73) Assignee: Nokia Corporation, Espoo (FI)

( * ) Notice: Subject to any disclaimer, the term of this patent is extended or adjusted under 35 U.S.C. 154(b) by 414 days.

(21) Appl. No.: 10/309,335

(22) Filed: Dec. 3, 2002

(65) Prior Publication Data

US 2004/0204055 A1  Oct. 14, 2004

(51) Int. Cl.[7] .................................................. H04M 1/00
(52) U.S. Cl. .................. 455/556.1; 455/557; 455/566; 455/575.1
(58) Field of Search ........................... 455/556.1, 557, 455/566, 575.1

(56) References Cited

U.S. PATENT DOCUMENTS

| | | | |
|---|---|---|---|
| 6,452,577 B1 * | 9/2002 | Gale et al. | 345/87 |
| 6,628,320 B2 * | 9/2003 | Mukai et al. | 348/14.01 |
| 6,643,072 B2 * | 11/2003 | Mihara | 359/686 |

* cited by examiner

Primary Examiner—Temica Beamer
(74) Attorney, Agent, or Firm—Ware, Fressola, Van Der Sluys & Adolphson LLP

(57) ABSTRACT

Mechanical and operational design considerations for the antenna, speaker and image capture functionalities, in a multi-media mobile communication device are combined and carried in a common shared antenna-speaker-image capture chamber. The common shared chamber permits greater focal lengths and larger optics packages compared to conventional multi-media communication devices with separate, individual chambers within the device.

15 Claims, 4 Drawing Sheets

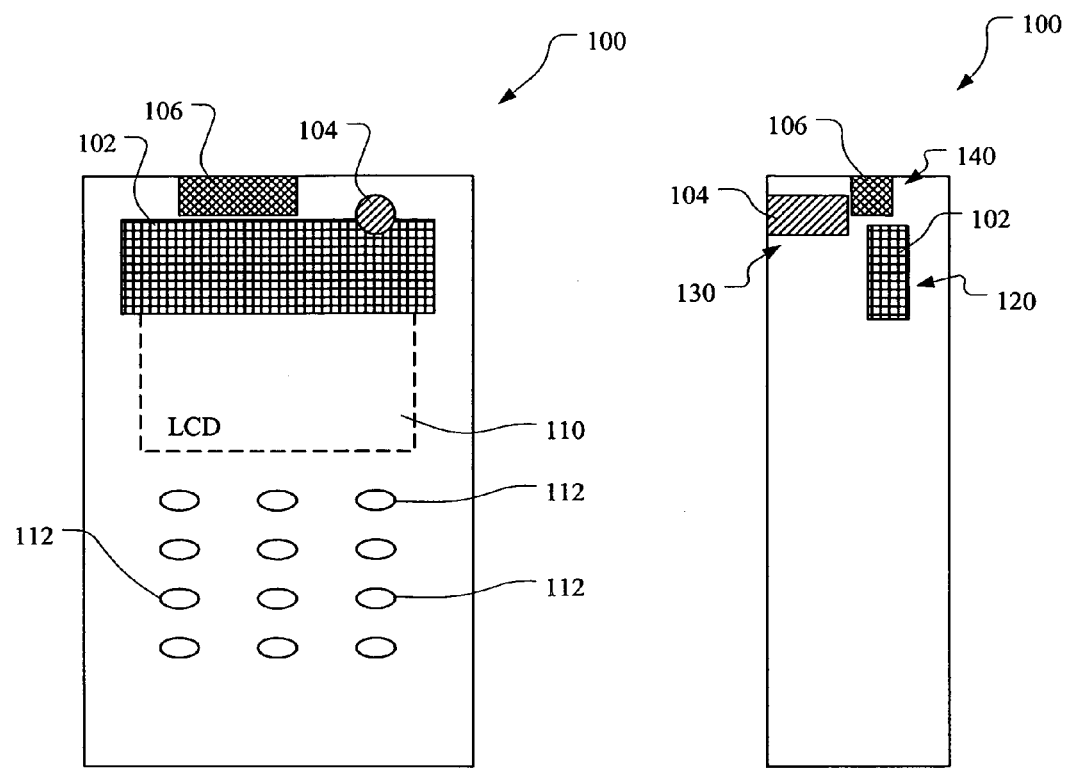
FIG. 1
PRIOR ART
FIG. 2
PRIOR ART
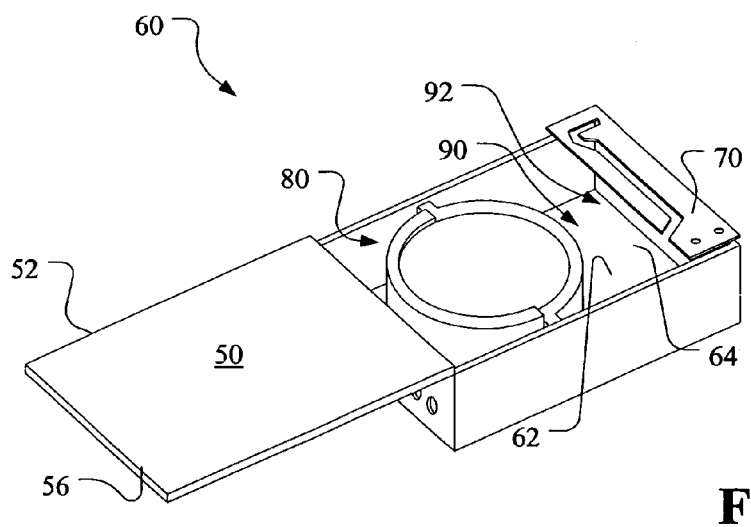
FIG. 3
PRIOR ART

MULTI-MEDIA MOBILE COMMUNICATION DEVICE AND RELATED CONSTRUCTION METHOD

BACKGROUND OF THE INVENTION

The present invention relates generally to the field of mobile communication devices and deals more particularly with a package and housing design that combines the mechanical design considerations for the RF, acoustic and image capture functionalities to reduce the overall physical size of the device and at the same time enhance the RF, accoustic and optics performance.

The growth in the use of portable electronic devices such as, for example mobile communication devices, cellular telephones and the like, has driven the design of such devices to become smaller and more convenient and include further features and functionalities. These newer feature and functionality laden mobile communication devices have led to a new product category in the mobile phone industry as multi-media phones. Multi-media phones are highly desirable and are characterized by some type of camera or image capturing feature and a wide range or diversity of audio features and functionality, such as, music playback, which may or may not be combined with some type of video or graphics.

Consumers have become accustomed to the convenience and portability of cellular telephones and have demanded that those cellular telephones become even more convenient and even more portable. The constant thrust in cellular telephone design is to make them as small as possible and the same demands are placed on multi-media mobile phones.

Conventional multi-media mobile communication devices such as for example, of the type shown by the prior art in FIG. 1 and FIG. 2 and generally designated 100 typically include an internal antenna 102, a speaker or audio transducer component 104 to provide audio functionality and a camera system or other similar imaging sensor 106 to provide image capture functionality. The multi-media mobile communication device may be, for example, a cellular telephone and include a display such as an LCD or other visual display panel generally designated 110 and include keys 112, 112 which are used for dialing the desired telephone number or for activating and utilizing features of the multi-media cellular telephone 100. The internal antenna 102 includes an RF-emitter that is generally held or located in a spaced separation with respect to a ground plate mounted in a chassis or sub-assembly within the housing of the device 100. The RF-emitter electrically connects to the operational electronic circuitry of the mobile communication device. The spaced separation between the RF-emitter and the ground plate area defines the mechanical outline of an antenna chamber volume generally designated 120, that is, the area or space beneath or under the antenna profile outline is clear of interference.

The audio functionality for the multi-media phone is typically provided by an audio transducer 104, such as, a loud speaker, earpiece and microphone which are located separate and away from the antenna RF-emitter to prevent interference with the emitter. Typically, the transducer or speaker 104 is mounted in an enclosure of some sort defining a chamber generally designated 130. The chamber 130 functions as an acoustic resonator and the physical size or volume of the chamber 130 influences the audio quality, and a larger volume generally results in better audio quality.

The image capture functionality of the multi-media phone is typically provided or carried out by a camera system or other similar sensor 106, such as an optics package or module that is also located separate and apart from the antenna functionality and audio functionality to prevent interference. The image capture functionality is also enclosed within the housing of the multi-media phone in an area or enclosure of a desired configuration defining a chamber generally designated 140 to accommodate the camera system. The camera system may include but is not limited to the camera lens, focus and image capturing components including any of the optic and electronic components necessary to carry out the intended function. As illustrated in the schematic functional block diagram shown in side elevational view in FIG. 2, the internal antenna 102, speaker component 104 and image capture unit 106 are maintained in a spaced relationship with respect to one another and typically consuming a large amount of space and volume within the housing thus adding to the overall size of the multi-media mobile communication device. The camera system or image capture functionality specifically, the size of the camera optics package or module 106 has been forced to be reduced in size and volume to accommodate the demand for smaller and more convenient mobile phones. To obtain the size reduction, lenses have been made smaller and accordingly the focal length of the camera system made shorter. As a consequence, the captured image quality (aberrations, brightness and other image quality characteristics) worsens and is less than desirable due to fundamental optics laws, manufacturing problems and tolerances and lens purity. In order to improve the captured image quality, the size of the camera optics package or module 106 must be made larger or high precision optics made of glass must be used. Accordingly, the internal antenna 102, audio transducer 104 and camera optics 106 impose separate mechanical design requirements and operational considerations that must be taken into account to insure the proper operation of each functionality to obtain the desired results. These functionality design and operational considerations add to the overall physical size of the multi-media mobile communication device 100, and each requires a relatively large air volume cavity within the mobile communication device to provide the desired and acceptable performance level.

U.S. patent application Ser. No. 10/099,476 titled, "Mobile Communication Device and Related Construction Method" and assigned to the same assignee as the present invention discloses a possible structure and method for sharing at least a portion of the volume required to provide the RF functionality and the acoustic functionality to further reduce the size of the mobile communication device while maintaining acceptable performance levels. In the referenced application, which is incorporated herein by reference, a common shared chamber provides sufficient air volume for the RF antenna functionality and required back cavity air volume for the audio transducer. However, the image capture functionality remains physically separate in its own space or area within the housing.

Consequently, there is a need to identify further construction methods and designs that provide the desired overall physical size reduction and yet provide a chamber having a sufficient air volume to accommodate RF antenna, acoustic and image capture functionalities while overcoming the disadvantages of known multi-media mobile communication devices.

Therefore, it is a general object of the present invention to provide a mechanical design that reduces the size of the multi-media mobile communication device.

It is a further object of the present invention to provide a design method to combine the RF functionality, accoustic functionality and image capture functionality without increasing the size of the multi-media mobile communication device.

It is another object of the present invention to provide a reduced size multi-media mobile communication device by sharing a common physical volume for the RF antenna, the audio transducer and the camera system that accommodates the mechanical and operational design requirements of the RF antenna, speaker and camera system, respectively.

It is a yet further object of the present invention to provide a reduced size multi-media mobile communication device wherein the RF antenna common shared volume chamber provides the required back cavity air volume for the audio transducer and image capture camera optics.

SUMMARY OF THE INVENTION

In accordance with a first aspect of the invention, a multi-media mobile communication device of the type having a RF transmitter and receiver, a RF antenna, a speaker component and imaging functionality includes a housing for carrying subassemblies comprising an operational communication device. The housing itself is generally a contoured case that has an exterior surface and an interior surface. In one embodiment, the interior surface forms and defines a shared interior cavity within the housing for carrying a speaker component and a RF antenna with the further improvement of carrying the imaging functionality. Preferably, the imaging functionality further comprises camera optical means, which may further include camera sensor means. The camera sensor means may be located within or outside the shared interior cavity.

Preferably, the camera optical means includes a camera lens carried within the shared interior cavity and located intermediate of the camera sensor means and an aperture in a wall of the interior cavity and defining an optical path having a first focal length.

Preferably, the multi-media mobile communication device includes one or more lenses defining a lens system being located intermediate the camera lens and the aperture along the optical path and defining a second focal length to improve the quality of an image being captured.

Preferably, the lens system includes means for varying the focal length along the optical path to improve the quality of an image being captured.

Preferably, the housing includes a window in optical alignment with the camera sensor means whereby an image is captured when the housing is held in an orientation with the window pointed in the direction of the image.

Preferably, a further lens is located in the housing window.

Preferably, the RF antenna is an internal planar antenna located in a spaced relationship to and with the audio component and the camera means.

Preferably, the shared interior cavity provides a suitable air volume to simultaneously accommodate RF antenna functionality, audio functionality and imaging functionality.

Preferably, the shared interior cavity carrying the antenna, audio and imaging functionality is a substantially sealed acoustic cavity.

In accordance with a further aspect of the invention, a multi-media mobile communication device has antenna functionality, speaker functionality and imaging functionality and includes a housing for carrying subassemblies of the operational communication device. The housing has an interior cavity of a predetermined volume for accommodating the antenna functionality, speaker functionality and imaging functionality.

In another aspect of the invention, a multi-media mobile communication device includes a housing for carrying subassemblies defining the operational communication device. Speaker means are provided for producing audible signals, and antenna means are provided for transmitting and receiving RF signals and camera means are provided for capturing image signals. Cavity means defining a substantially sealed chamber within the housing carry the speaker means, the antenna means and the camera sensor means. Additionally, the cavity means defines a common shared chamber that functions as an acoustic resonator chamber, an antenna-ground plate separation chamber and imaging capture chamber.

A yet further aspect of the invention relates to a method for construction of a multi-media mobile communication device having combined RF antenna, audio and imaging functionalities. The method for construction comprises the steps of: locating the RF antenna means, audio transducer means and camera sensor means in a combined shared chamber within the multi-media mobile communication device.

BRIEF DESCRIPTION OF THE DRAWINGS

Other objects, features and benefits of the present invention will become readily apparent from the following written detailed description taken together with the drawings forming a part thereof, wherein FIG. 1 is a schematic functional block diagram of a conventional multi-media phone representative of the prior art;

FIG. 2 is a schematic functional block diagram in a side elevation view of the conventional multi-media phone illustrated in FIG. 1 representative of the prior art;

FIG. 3 is a schematic representation of a portion of a mobile communication device showing the construction of a prior art combined common shared antenna-speaker chamber;

DETAILED DESCRIPTION OF PREFERRED EMBODIMENTS

Figure 4:
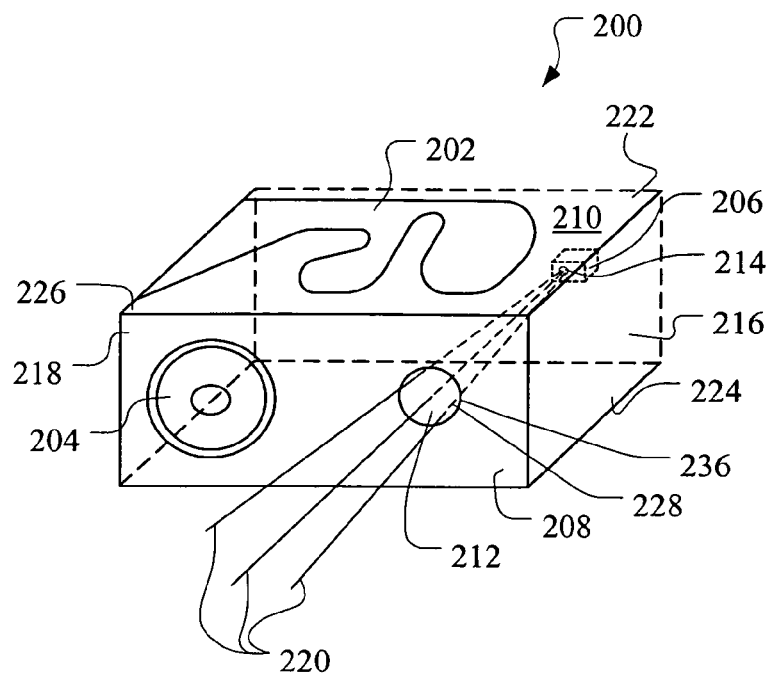
FIG. 4 is a schematic functional block diagram representation of a portion of a multi-media mobile communication device showing the combined common shared antenna-speaker-image capture chamber embodying the present invention.

In order to gain a better understanding of the present invention, a discussion of a prior art combined common shared antenna-speaker chamber is illustrated in FIG. 3 as a schematic representation of a portion of a mobile communication device and is generally designated 60. As illustrated in FIG. 3, the planar antenna 70 and audio transducer or speaker component 80 share a common cavity or chamber 90 with a portion 92 of the chamber 90 located in the area beneath the antenna 70. The antenna and audio transducer are combined into a single mechanical configuration that meets both the acoustic requirements and the RF requirements of the mobile communication device. The planar antenna 70 may be carried on a surface 50 of the cover 52 forming a part of the chamber 60 when the cover is in place. The cover 52 provides rigidity to the planar antenna which may be printed or deposited thereon on the upper surface 50 or on the inner surface 56 disposed opposite the outer surface 50 and facing inwardly toward the chamber cavity 90. The planar antenna 70 is printed in a manner well known to those skilled in the art of mobile communication devices and is connected in a normal manner to the operational electronic circuitry defining the mobile communication device.

The antenna 70 or the surface carrying the antenna is held or otherwise mounted in a generally fixed and spaced relationship with respect to an inner surface or plane 62 of the chamber or with respect to a substrate, such as an electrical printed circuit board (not shown) carried within the chamber 60. The printed circuit board is well known to those skilled in the art and may take on many different forms and shapes to accommodate the packaging of the mobile communication device. A ground plane or plate 64 such as metallized paint or other conductive materials to carry out the intended function is carried on at least a portion of the cavity surface 62 and in a spaced relation to the planar antenna 70. To operate properly, the RF-emitter of the antenna 70 is mechanically placed or constructed such that there are no electrical conductors or dielectric materials near the emitter. In the prior art combined common shared antenna-speaker chamber design shown in FIG. 3, the ground plane 64 prevents the inadvertent or unintentional placement of electrically conducting material such as circuit paths and electrical components in the vicinity of or beneath the RF-emitter of the antenna 70. The chamber is a substantially sealed chamber to provide the desired acoustic characteristics and audio passes through "leak" holes in the chamber wall.

Although the antenna chamber volume can be a part of the speaker chamber volume, and thus the total combined volume for the speaker and antenna is less than the two separate volumes of the antenna and the speaker, an additional volume or space is required within the housing of a multi-media mobile communication device having a prior art combined common shared antenna-speaker chamber.

Now considering the invention in further detail, a schematic functional block diagram representation of a portion of a multi-media mobile communication device embodying the combined common shared antenna-speaker-image capture chamber embodying the present invention is illustrated in FIG. 4 and generally designated 200. The combined common shared chamber 200 may be formed as an integral portion of the device housing or may be a separate structural component part or module located within the housing. The combined common shared chamber 200 includes an internal planar antenna generally designated 202 and an audio transducer, for example, a speaker generally designated 204. The combined common shared chamber 200 also includes the imagining capture functionality and comprises in the illustrated embodiment, a camera sensor generally designated 206 carried on the interior surface generally designated 210 of a wall 222 of the chamber 200. An aperture or opening 212 is located in a wall 208 in an oppositely disposed and spaced relation with the wall 222. The aperture 212 is aligned opposite the camera sensor 206 so that arrows 220, 220 which are representative of light paths of an image pass through the aperture 212 along an optical path having a first focal length and impinge on the surface 214 of the camera sensor 206. The term "aperture" as used herein defines the optical opening through which light paths of an image pass along an optical path. It will be noted that the aperture is not a physical opening allowing communication between the outside and inside of the chamber because the desired acoustic characteristic achieved by the sealed chamber would be affected. Therefore, as a practical matter, the aperture 212 contemplates a physical window barrier 228 in the wall to maintain the chamber substantially sealed while admitting light paths. An optically clear window may form the aperture 212. It should be apparent that a sealing means 236 may be utilized between the edges of the window and chamber wall to maintain the desired sealed chamber 200. The internal volume of the combined common shared chamber 200 is determined by the dimensions of height and width and depth of the chamber 200 and is calculated to provide the necessary mechanical design requirements for the antenna and camera optics and satisfy the acoustic transducer volume requirements to insure the desired acoustic resonator performance for the characteristics of the audio transducer 204.

The walls 208, 216, 218, 222 and the bottom cover 224 and oppositely disposed upper cover 226 are preferably made of a strong, light-weight plastic material to provide the necessary mechanical rigidity to carry the audio transducer 204 and the camera optics 206 without adding any appreciable weight to the multi-media mobile communication device. Alternately, the aperture 212 may include an additional camera lens or lens system in addition to or in place of the window barrier 228 to further enhance or improve image quality. The choice of plastic or other desirable material to carry out the intended function is dependent on the actual construction and fabrication techniques employed to manufacture the combined common shared chamber and such materials are well known to those skilled in the art. The material of the combined common shared chamber is not restricted to plastic or presently known materials and contemplates the use of other currently known or future developed materials.

The walls, bottom and upper covers can be glued or otherwise sealed or can be sonically welded to provide the substantially sealed combined common shared chamber 200. Other methods including molding the combined common shared chamber 200 with the antenna, audio transducer and camera optics in place are likewise suitable methods for construction and are well known to those skilled in the art. The physical appearance or configuration of the combined shared chamber 200 is not restricted to any given shape, but may be contoured and shaped to accommodate the size and shape of a multi-media communication device housing with which it is used. The important aspects to take into account are the mechanical design considerations to achieve the desired performance levels of the RF-antenna, acoustic and image capture functionalities. It should also be apparent that a corresponding window lens or opening must be located in a wall of the multi-media communication device to admit the image.

Figure 5A:
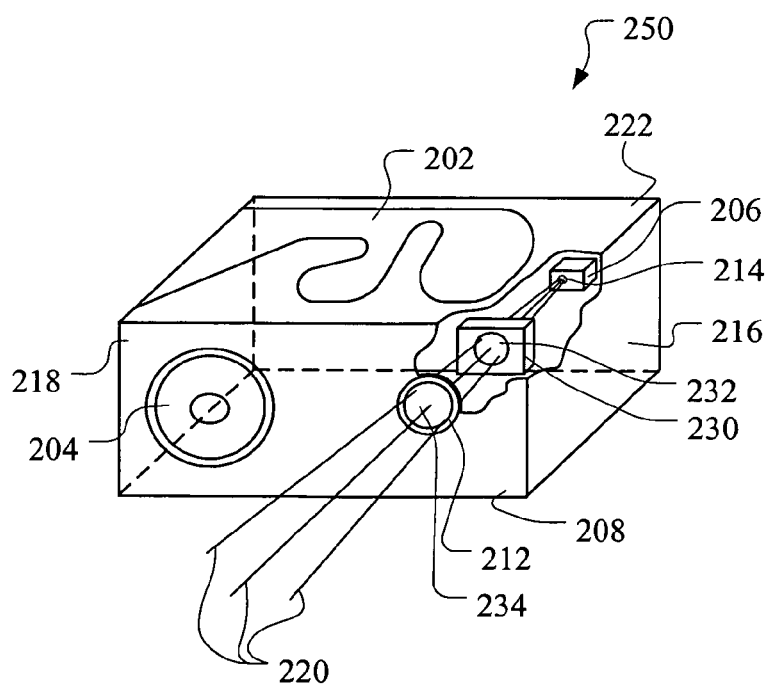
FIG. 5A is a schematic functional block diagram representation of a portion of a multi-media mobile communication device showing another embodiment of the combined common shared antenna-speaker-image capture chamber of the present invention wherein an additional optics system is located between the aperture and the camera sensor.
Figure 5B:
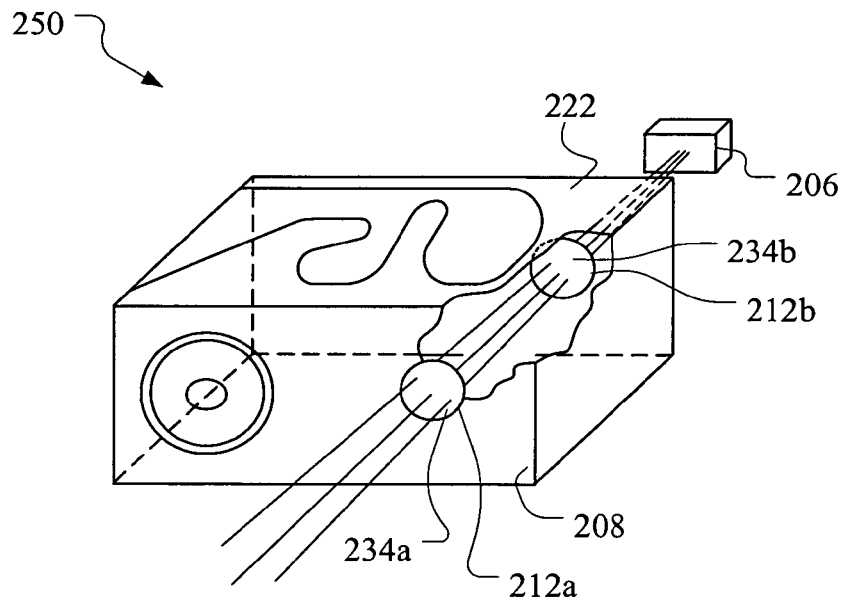
FIG. 5B is a schematic functional block diagram representation of a portion of a multi-media mobile communication device showing another embodiment of the combined common shared antenna-speaker-image capture chamber of the present invention wherein an aperture is located in oppositely disposed walls and the camera sensor is located outside the chamber.
Figure 5C:
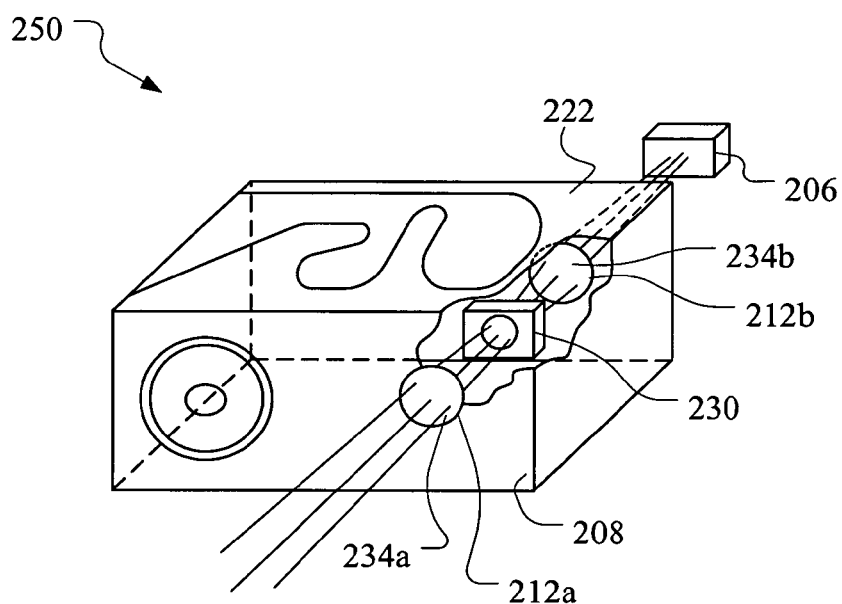
FIG. 5C is a schematic functional block diagram representation of a portion of a multi-media mobile communication device showing another embodiment similar to FIG. 5C wherein an additional lens system is located in the chamber between the apertures located in oppositely disposed walls and with the camera sensor located outside the chamber.

Turning now to FIGS. 5A, 5B and 5C an alternate embodiments of the combined antenna-speaker-image capture chamber of the present invention are illustrated as a schematic functional block representation therein and generally designated 250. The embodiments shown in FIGS. 5A, 5B and 5C are similar in appearance to that shown in FIG. 4 and like reference numbers refer to like parts. In FIG. 5A, the combined common shared chamber 250 includes an additional optics system including a lens or lens system 230 physically located within the chamber intermediate the camera sensor 206 and the aperture 212. The lens system 230 may include one or more lenses as required to provide the desired optical focus and focal length, for example, a wide angle capture of an image or a smaller angle capture of an image. Although not shown, the lens system 230 may have a telescopic capability controllable by suitable electronics carried in the multi-media mobile phone. Arrows 220, 220 which are representative of light paths of an image pass through the aperture 212 and lens system aperture 232 along an optical path having a second focal length compared to the embodiment of FIG. 4 to impinge on the surface 214 of the camera sensor 206. Optionally, the aperture 212 may include an additional lens 234 to provide further enhanced image capture quality. Since the focal length of the system is longer than that available with prior art multi-media phones, the lens may be of an optical grade plastic and achieve, at a lesser cost of components or construction, similar or better image quality than that of glass lenses used in prior art multi-media mobile phones.

Additional combinations of camera optics, lenses and sensor placements are also possible and contemplated by the present invention as illustrated in FIGS. 5B and 5C. For example, and not by way of limitation, it may be desired to locate a lens system 234a, 234b in apertures 212a, 212b respectively in oppositely disposed walls 208, 222 of the chamber 250 with the camera sensor 206 located outside the chamber. It may also be desired to include one or more lens systems 230 inside the chamber located along the optical path between the apertures 212a, 212b in the oppositely disposed walls 208, 222 of the chamber 250.

It will be recognized and appreciated by those skilled in the art that the above schematic functional block representations are provided for illustrative purposes only to explain the features and benefits of the present invention. It will be recognized that the mechanical structural elements forming the common shared antenna-speaker-image capture chamber can be integral with the interior of the multi-media mobile communication device housing and produced as a part of the plastic injection molding process or other manufacturing process techniques employed either now known or future-developed. The important idea to be carried away from the above disclosure is the combination of the otherwise separate common shared antenna-speaker chamber with the image capture functionality to reduce the overall size of the multi-media mobile communication device.

The construction method of the present invention includes providing a common shared antenna-speaker-image capture chamber or cavity within the interior of the housing of the multi-media mobile communication device and locating the camera system within the chamber such that the camera system does not interfere with the operation of the RF-emitter of a planar antenna carried on a surface of a covering substrate enclosing the speaker within the common shared antenna-speaker-image capture chamber and the antenna and speaker do not interfere with the operation of the camera system.

Figure 6:
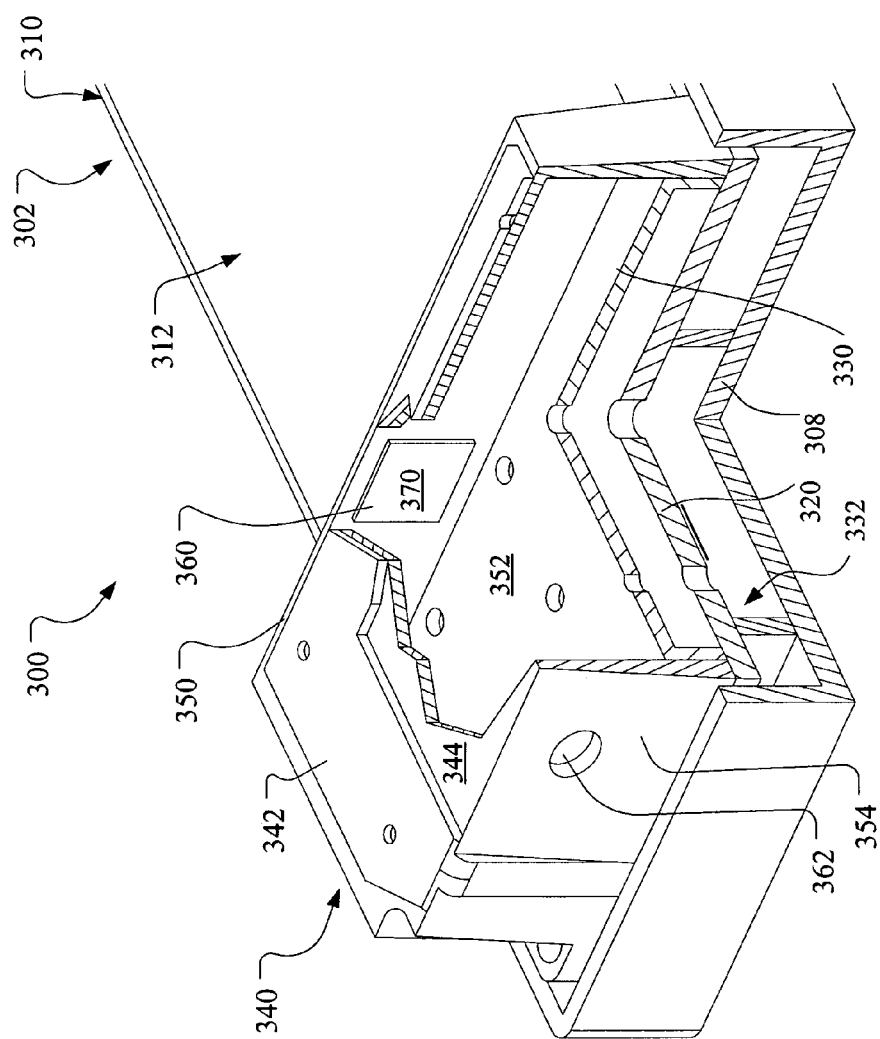
FIG. 6 is a schematic representation of an exemplary cover of a multi-media mobile communication device illustrating the combined common shared antenna-speaker-image capture chamber embodying of the present invention.

Turning now to FIG. 6, a partially cut-away portion of an opened cover of a reduced size multi-media mobile communication device showing an alternate embodiment of a combined common shared antenna-speaker-image capture chamber embodying the present invention is illustrated therein and generally designated 300. The cover, generally designated 302, includes a housing structure 310 for carrying subassemblies, generally designated 312, which make up the operational multi-media communication device. A ground plate 320 is carried in a spaced relationship with respect to the base wall 308. A printed circuit board generally designated 330 is held in a spaced relationship with respect to the ground plate 320 and which circuit board 230 carries various electronic components and printed circuit paths for power and signal distribution and for other uses and functions well known to those skilled in the art of multi-media mobile communication devices.

A supporting structure generally designated 340 carries the planar antenna 342 on a face surface 344 of the structure 340 it being understood and that the planar antenna can also be carried on the interior face surface opposite 344. The speaker, generally designated 332, is mounted such that the cone or sound emitting portion is in facing relationship with the base 308 and sound or audio generated by the speaker is communicated through apertures or openings through the base surface in any well-known manner.

A wall 350 carries on its interior surface 352, a camera or image capture sensor 360. An aperture or opening generally designated 362 is located in a wall 354 and is aligned with or otherwise positioned with respect to the camera sensor 360 so that light rays pass through the aperture 362 and impinge on the capture surface 370 of the camera sensor 360.

A multi-media mobile communication device having a common shared antenna-speaker-image capture chamber and related construction method has been presented above in several preferred embodiments. Numerous changes and modifications may be made to the above embodiments without departing from the spirit and scope of the present invention. For example, the cover of the common shared antenna-speaker-image capture chamber may be provided by a complementary mating surface of another portion of the housing for the multi-media mobile communication device. Accordingly, the present invention has been disclosed by way of example rather than limitation.

What is claimed is:

1. A reduced size mobile communication device comprising:
   a housing structure comprising a contoured case having a base wall with an exterior surface and interior surface for carrying subassemblies defining an operational communication device;
   speaker means for producing audible sounds;
   antenna means for transmitting RF signals;
   camera sensor means for capturing an image;
   cavity means within said housing structure for carrying said speaker means and said antenna means and said camera sensor means, said cavity means further defining an antenna support structure having a substantially sealed common shared chamber comprising multiple acoustic cavities in communication with one another and further comprising a first chamber defined between an upper wall portion of said antenna support structure and a printed circuit board (PCB) positioned a spaced distance below said upper wall portion, a second chamber defined between said PCB and a ground plate positioned a spaced distance below said PCB, a third chamber defined between said base wall and said ground plate positioned a spaced distance above said base wall, said speaker means carried in said third chamber and said camera sensor means carried in said first chamber, said first and second chambers providing a controlled back cavity defining an acoustic resonator chamber to provide a desired acoustic characteristic from said speaker means.

2. Method for construction of a multi-media mobile communication device having combined RF antenna, audio, and image capture functionalities, comprising the steps of:
providing a housing structure for carrying subassemblies defining an operational communication device;
providing a common chamber within said housing structure having multiple acoustic cavities in communication with one another and providing an internal planar RF antenna support structure;
locating the planar RF antenna on the antenna support structure;
locating audio transducer means in one of the acoustic cavities;
locating camera sensor means in another of the acoustic cavities;
providing an acoustic volume in each of said acoustic cavities so that the sum of the volumes of said multiple acoustic cavities provide a controlled volume back cavity having an acoustic volume to provide a desired acoustic characteristic from the audio transducer means.

3. A multi-media mobile communication device, comprising:
an RF transmitter and receiver, an RF antenna, a speaker component and an image capture component;
a housing structure for carrying subassemblies defining an operational communication device, said housing structure further comprising a contoured case having a base wall with an exterior surface and an interior surface;
a common chamber defined within said housing structure and arranged for carrying the RF antenna, the speaker component and the image capture component;
said common chamber further comprising multiple acoustic cavities wherein one of said acoustic cavities carries the image capture component and each of said cavities having an acoustic volume wherein the sum of the volumes of said multiple acoustic cavities provide a speaker chamber having an acoustic volume to provide a desired acoustic characteristic from the speaker component.

4. The multi-media mobile communication device as set forth in claim 3, characterized in that said image capture component functionality further comprises camera optical means.

5. The multi-media mobile communication device as set forth in claim 4, further characterized by camera sensor means.

6. The multi-media mobile communication device as set forth in claim 5 further characterized in that said camera sensor means is located within said common chamber.

7. The multi-media mobile communication device as set forth in claim 5 further characterized in that said camera sensor means is located outside said common chamber.

8. The multi-media mobile communication device as set forth in claim 5 further characterized in that said camera sensor means includes a camera lens carried within said common chamber and located intermediate of said camera sensor means and an aperture in a wall of said common chamber and defining an optical path having a first focal length.

9. The multi-media mobile communication device as set forth in claim 8, further characterized by one or more lenses defining a lens system being located intermediate said camera lens and said aperture along said optical path and defining a second focal length to improve the quality of an image being captured.

10. The multi-media mobile communication device as set forth in claim 9 characterized in that said lens system includes means for varying the focal length along said optical path to improve the quality of an image being captured.

11. The multi-media mobile communication device as set forth in claim 8 further characterized in that said housing includes a window in optical alignment with said camera sensor means whereby an image is captured when said housing is held in an orientation with said window pointed in the direction of the image.

12. The multi-media mobile communication device as set forth in claim 11 further characterized by a further lens being located in said window.

13. The multi-media mobile communication device as set forth in claim 3, further characterized in that said RF antenna is an internal planar antenna located in a spaced relationship to and with said audio component and said camera sensor means.

14. The multi-media mobile communication device as set forth in claim 3, further characterized in that said common chamber provides a suitable air volume to simultaneously accommodate RF antenna functionality, audio speaker functionality and imaging functionality.

15. The multi-media mobile communication device as defined in claim 3 wherein said common chamber is substantially sealed.

* * * * *